United States Patent
Staf

(10) Patent No.: US 9,713,845 B2
(45) Date of Patent: Jul. 25, 2017

(54) METHOD AND ARRANGEMENT FOR MANUFACTURING A CUTTING INSERT

(71) Applicant: SANDVIK INTELLECTUAL PROPERTY AB

(72) Inventor: Hjalmar Staf, Stockholm (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 471 days.

(21) Appl. No.: 14/290,475

(22) Filed: May 29, 2014

(65) Prior Publication Data

US 2014/0356214 A1 Dec. 4, 2014

(30) Foreign Application Priority Data

May 30, 2013 (EP) .................... 13169833

(51) Int. Cl.
| | |
|---|---|
| B22F 3/12 | (2006.01) |
| B23B 27/16 | (2006.01) |
| B22F 3/03 | (2006.01) |
| B22F 5/10 | (2006.01) |
| B30B 11/00 | (2006.01) |
| B30B 11/02 | (2006.01) |
| C22C 29/08 | (2006.01) |
| B22F 5/00 | (2006.01) |

(52) U.S. Cl.
CPC ......... *B23B 27/1662* (2013.01); *B22F 3/03* (2013.01); *B22F 3/12* (2013.01); *B22F 5/10* (2013.01); *B30B 11/007* (2013.01); *B30B 11/027* (2013.01); *B22F 2003/031* (2013.01); *B22F 2005/001* (2013.01); *B22F 2005/103* (2013.01); *B23B 2200/3618* (2013.01); *B23B 2205/04* (2013.01); *B23B 2228/00* (2013.01); *C22C 29/08* (2013.01)

(58) Field of Classification Search
None
See application file for complete search history.

(56) References Cited

U.S. PATENT DOCUMENTS

| | | | |
|---|---|---|---|
| 6,645,426 B1 * | 11/2003 | Yoshihara | B22F 3/03 419/38 |
| 6,986,866 B2 * | 1/2006 | Gubanich | B22F 3/03 419/38 |

FOREIGN PATENT DOCUMENTS

| | | | |
|---|---|---|---|
| JP | 2271526 | * | 4/1994 |
| JP | 2002-11596 | * | 1/2002 |
| JP | 2009125796 A | | 6/2009 |
| WO | 2009085002 A1 | | 7/2009 |

* cited by examiner

*Primary Examiner* — Jessee Roe
*Assistant Examiner* — Ngoclan T Mai
(74) *Attorney, Agent, or Firm* — Corinne R. Gorski

(57) ABSTRACT

A method for manufacturing a cutting insert having a through-hole that extends in a direction that is non-parallel to the main pressing direction. The method includes the steps of moving first and second punches within a die cavity toward each other along a first pressing axis and compacting a powder around a core rod into a cutting insert green body, wherein, during at least a portion of the compaction step, the core rod is turned a predetermined angle in alternating direction around its longitudinal axis.

15 Claims, 10 Drawing Sheets

METHOD AND ARRANGEMENT FOR MANUFACTURING A CUTTING INSERT

RELATED APPLICATION DATA

This application claims priority under 35 U.S.C. §119 to EP Patent Application No. 13169833.4, filed on May 30, 2013, which the entirety thereof is incorporated herein by reference.

TECHNICAL FIELD

The present disclosure relates to a method for manufacturing a cutting insert and an arrangement for manufacturing a cutting insert.

BACKGROUND

Cutting inserts are metal cutting tools for machining of metal by milling, drilling or turning or by similar chip forming methods. Cutting inserts are produced by powder metallurgical methods from a metallic powder, for example a mixture comprising tungsten carbide and cobalt, such as a cemented carbide powder, or from a ceramic powder, for example a mixture comprising aluminum oxide, silicon nitride and silicon carbide. Cutting inserts may also be manufactured from cermets, for example from a mixture comprising titanium carbide and nickel, or other materials such as, for example, cBN materials. The powder is compacted into a cutting insert green body by opposing first and second punches in a die cavity. After compaction, the cutting insert green body is removed from the die cavity and subjected to sintering into a strong cutting insert.

Typically, cutting inserts are provided with a through-hole by which the cutting insert may be attached to a tool holder by means of a screw or pin.

In manufacturing of certain types of cutting inserts, so called "tangential inserts" or "cross-hole inserts" the through-hole is formed by a core rod which is inserted into the die cavity in a direction which is non-parallel to the main pressing direction.

A problem related to the manufacturing of tangential inserts is that the non-parallel arrangement of the core rod in relation to the main pressing direction causes the density distribution in the cutting insert green body to vary around the through-hole. When the cutting insert green body shrinks during sintering, the uneven density distribution causes the through-hole to deform.

Various attempts have been made in the past to solve this problem.

WO2009/085002 describes a method which uses a core rod that is divided into a separate male and female part to form the through-hole. During the compaction step, the male and female core rod parts are pressed into each other to increase the density of the powder around the through-hole. Although proven successful to some extent, the method of WO2009/085002 leaves room for further improvement of the dimensional accuracy of the through-hole. The method of WO2009/085002 further involves the use of complicated designed core rods and multi axial pressing equipment.

In U.S. Pat. No. 6,986,866 B2 a core rod of non-circular cross-section is used to form the through-hole in order to compensate for deformation of the through-hole during sintering. However, due to difficulties in predicting and matching deformation of the through-hole with the shape of the core rod, the method of U.S. Pat. No. 6,986,88 B2 does not provide through-holes of high dimensional accuracy in the sintered cutting insert.

Consequently, it is an object of the present disclosure to provide a method which allows for manufacturing of cutting inserts with a through-hole with improved dimensional accuracy. A further object is to provide a simple and cost effective method of manufacturing cutting inserts with a through-hole with improved dimensional accuracy. It is also an object to provide an arrangement which allows for manufacturing of cutting inserts having through-holes with high dimensional accuracy.

SUMMARY

According to a first aspect of the disclosure at least one of the above objects is achieved by a method for manufacturing a cutting insert having a through-hole, by using a press tool having a die including a die cavity extending through the die along a first pressing axis, a first punch and a second punch, which are movable toward and away from each other and along the first pressing axis and a core rod that is arranged to be inserted into the die cavity in a direction which is non-parallel to the first pressing axis. The method includes the steps of moving the first and second punches to a die filling position; inserting the core rod into the die cavity; filling the die cavity with powder; moving the first and second punches within the die cavity toward each other along the first pressing axis to compact the powder around the core rod into a cutting insert green body; moving the core rod and the first and second punches to an ejection position to allow removal of the cutting insert green body from the die; and sintering the cutting insert green body, wherein during at least a portion of the compaction step, the core rod is turned a predetermined angle in alternating direction around its longitudinal axis.

By turning of the core rod in alternating direction around its longitudinal axis during the compaction step, shear and redistribution of the powder close to the core rod causes a very even density distribution in the powder around the through-hole in the cutting insert green body. The low density variation results in minimized deformational changes of the through-hole when the cutting insert green body shrinks during sintering.

A further advantage of the disclosure is that cutting inserts produced by the present method have very low porosity in comparison with cutting inserts manufactured by prior-art methods. This results in stronger cutting inserts with long operational life.

The disclosure also relates to an arrangement for manufacturing a cutting insert having a through-hole, wherein the arrangement includes a press tool having a die with a die cavity extending through the die along a first pressing axis; a first punch and a second punch, which are movable toward and away from each other and along the first pressing axis; a core rod arranged to be inserted into the die cavity in a direction which is non-parallel to the first pressing axis; and a driving device that is arranged to turn the core rod a predetermined angle in alternating direction around its longitudinal axis.

The foregoing summary, as well as the following detailed description of the embodiments, will be better understood when read in conjunction with the appended drawings. It should be understood that the embodiments depicted are not limited to the precise arrangements and instrumentalities shown.

DEFINITIONS

By "alternating direction" is meant that the core rod is turned alternatingly in clockwise- and anti-clockwise or in anti-clockwise-/clockwise direction around its longitudinal axis.

By "compaction step" is meant a period during manufacturing of the cutting insert in which the opposite punches are in contact with the powder, the punches are moving towards each other within the die cavity and the density of the powder in the die cavity increases. The "compaction step" starts when the opposite punches are in non-compacting contact with the powder. The "compaction step" ends when the opposite punches have moved towards each other within the die cavity to a position which is determined by the final, desired, dimensions of the cutting insert green body.

DETAILED DESCRIPTION

Figure 1:
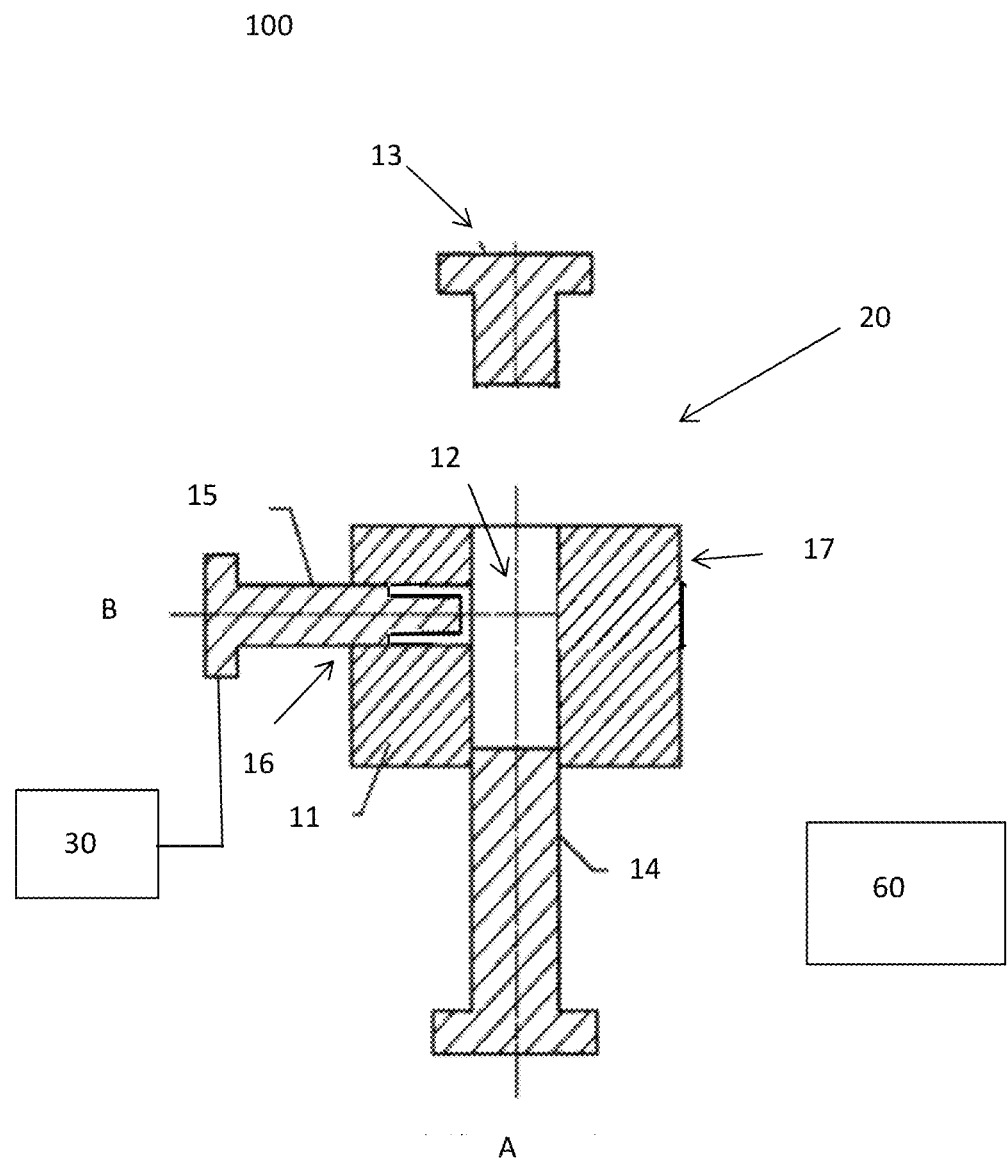
FIG. 1 is a cross-sectional view of an arrangement for manufacturing a cutting insert according to a first embodiment of the disclosure.

FIG. 1 shows an arrangement 100 used for performing the method of the present disclosure. The arrangement includes a press tool 20 having a die 11, which forms a circumferential wall 17 around a die cavity 12 extending through the die 11. The die cavity is through-going, i.e. open at both ends. The press tool 20 further includes a first punch 13 and a second punch 14. The punches 13 and 14 are arranged opposite to each other and are movable towards and away from each other along a first pressing axis A that extends through the center of the die cavity 12 and the center of the first and second punches 13, 14.

The punches 13 and 14 are arranged such that they can be moved towards each other within the die cavity 12 to compact a powder into a cutting insert green body. The first, upper, punch 13 is further arranged such that it can be moved away from the die cavity 12 to allow filling of powder in the die cavity or to allow removal of a cutting insert green body from the die cavity. The second, lower, punch 14 is further arranged such that it can be pushed into the die cavity 12 to eject a cutting insert green body from the die cavity. It is also possible that the first punch and/or the second punch consist of two or more concentrically arranged punches that can be moved independently along the first pressing axis A (not shown in FIG. 1). It is also possible that the press tool has a third and a fourth punch that are movable along a second pressing axis that extends in a non-parallel direction to the first pressing axis A (not shown in FIG. 1).

The press tool 20 further includes a core rod 15 for forming a through-hole in the cutting insert green body during compaction.

The core rod 15 is arranged to be inserted into the die cavity 12 through an opening 16 which extends through the circumferential wall 17 of the die 11. The opening 16 in the circumferential wall 17 is located such that the core rod 15 is inserted in the die cavity in a direction which is non-parallel with the first pressing axis A. The opening 16 is therefore located in the circumferential wall 17 such that when core rod 15 is inserted into opening 16, a longitudinal axis B extending through the center of the core rod 15 (and the center of the opening 16) intersect the first pressing axis A that extends through the center of the die cavity 12. In FIG. 1, the opening 16 is arranged such the longitudinal axis B through the center of the core rod 15 is perpendicular to the first pressing axis A. However, it is also possible to arrange opening 16 such that the longitudinal axis B of the core rod 15 intersects the first pressing axis A by any other angle.

The core rod 15 may have circular cross-section, i.e. a round cross-section, or non-circular cross-section, i.e. oval or elliptic cross-section.

Core rods of round cross-section are advantageous since they may be manufactured at low cost and in connection with the inventive method, produces through-holes of acceptable dimensional accuracy. However, in certain applications, where demands on dimensional accuracy of the through-hole are very high, it might be necessary to provide a non-circular through-hole in the cutting insert green body and therefore a core rod of non-circular cross-section may be used in the inventive method. During sintering, the non-circular through-hole is deformed into a circular through-hole by deformational changes caused by shrinkage of the cutting insert green body.

Figure 2A:
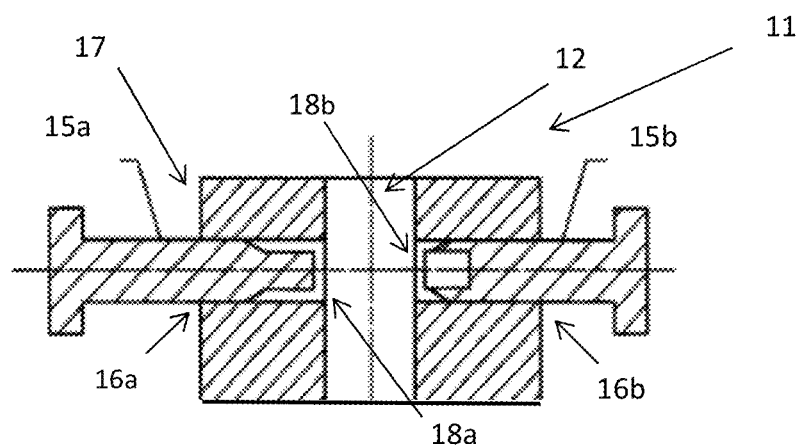
FIGS. 2a and 2b are cross-sectional views of a core rod according to an alternative embodiment of the disclosure.
Figure 2B:
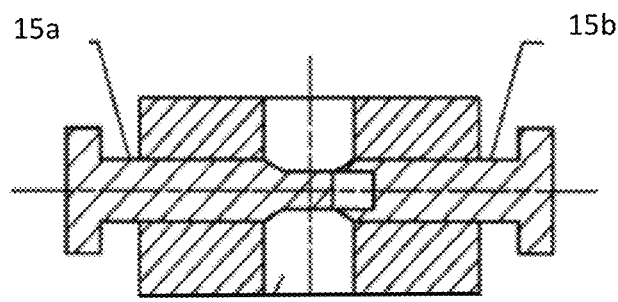

Referring to FIGS. 2a and 2b in an alternative arrangement, core rod 15 has a first core rod section 15a and a second core rod section 15b, which are inserted from opposite directions into the die cavity 12, so that front portions 18a and 18b of the core rod sections 15a, 15b contact each other in the die cavity 12 to form a continuous core rod. The core rod sections 15a, 15b are inserted through corresponding openings 16a and 16b in the circumferential wall 17 of the die 11. This enables the possibility to form non-cylindrical through-holes in the cutting insert. As shown in FIGS. 2a and 2b, the core rod sections 15a, 15b can produce a non-cylindrical through-hole in the cutting insert green body.

In FIGS. 2a and 2b, front portion 18a has a male configuration and front portion 18b has a female configuration so that front portion 18a may be inserted into front portion 18b to form a continuous core rod. However, it should be appreciated that the front portions of the core rod sections may have other configurations. For example, both front portion 18a and 18b may have a male configuration and contact each other in the die cavity to form a continuous core rod (not shown).

The press tool 20 may be arranged in a commercially available press, such as a CA-SP 160 Electric, which is commercially available from the company Osterwalder AG.

According to the disclosure, the arrangement 100 further includes a driving means 30 for turning the core rod 15 in alternating direction around its longitudinal axis B, see FIG. 1. The driving means may for example be an electrical motor or a hydraulic- or pneumatic actuator which is coupled to the core rod 15. A gearing arrangement and a controller (not shown) may also be arranged between the driving means 30 and the core rod 15 to control the movement of the core rod. In operation the driving means 30 turns the core rod a predetermined angle in a first direction, e.g. clockwise around its longitudinal axis and then a predetermined angle in the opposite direction, e.g. anti-clockwise. The driving means 30 may be arranged to repeatedly turn the core rod 15 in alternating directions. A sensor that measures the angle of turning, such as a rotary encoder, may be used to ensure that the core rod is turned a predetermined angle.

The arrangement 100 may also include a sintering furnace 60 for sintering the cutting insert green bodies which are manufactured in the press tool 20.

Referring to FIGS. 3a to 3f, the method of the disclosure is performed with an arrangement 100 having a press tool 20 and driving means 30 as described above.

Figure 3A:
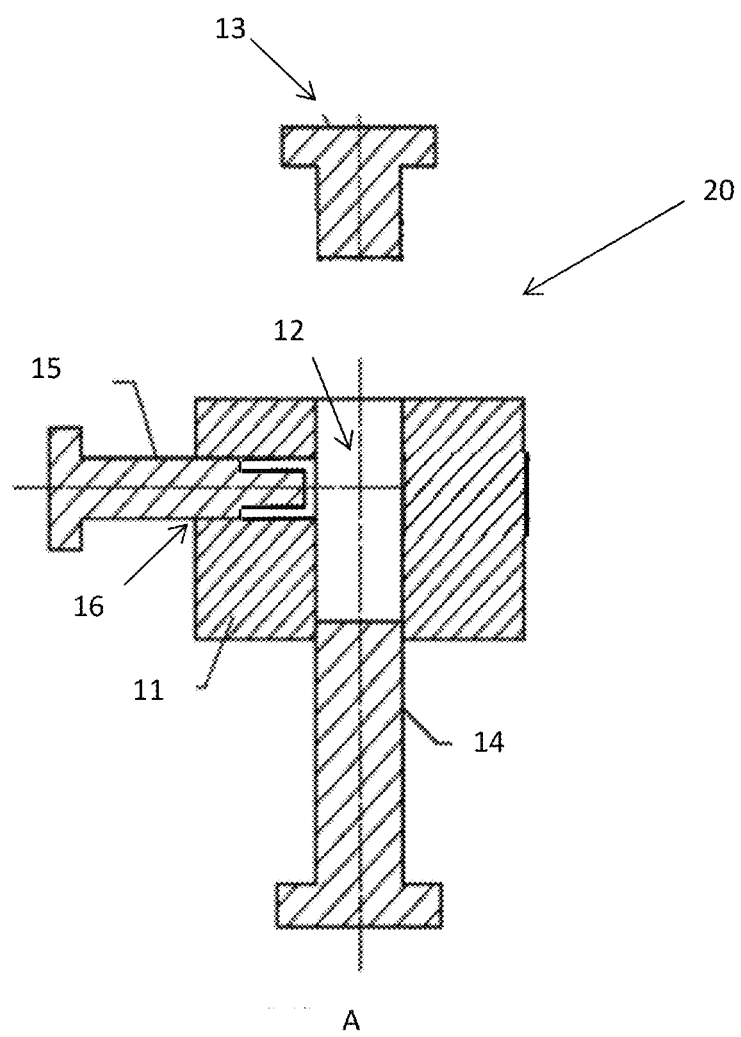
FIGS. 3a-3f are cross-sectional views illustrating the steps of the method for manufacturing a cutting insert according to the disclosure.

In a first step, see FIG. 3a, the core rod 15 and the first and the second punches 13, 14 are moved to a die filling position to enable filling of the die cavity 12 with a predetermined amount of powder. The first punch 13 is thereby moved away from the die cavity 12 and the second punch 14 is moved within the die cavity 12 to a position below the opening 16 for the core rod 15.

Figure 3B:
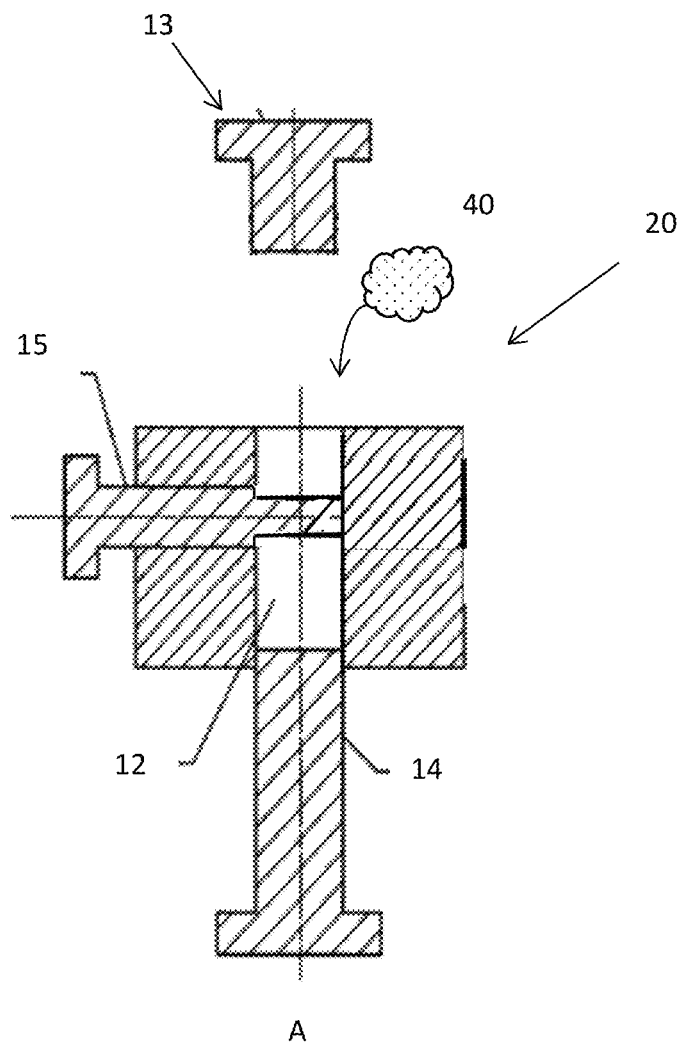

In a second step, see FIG. 3b, the core rod 15 is inserted into the die cavity 12 through the opening 16. In FIGS. 3a-f the core rod 15 is one, single, continuous core rod. However, as described above with reference to FIGS. 2a and 2b it is possible that the core rod includes two sections that are inserted from opposite directions into the die cavity.

In a third step, see FIG. 3b, the die cavity 12 is filled with a desired amount of powder 40, for example by a so called "filling shoe" (not shown). The powder has a composition which is suitable for manufacturing cutting inserts. For example, the power includes a blend of hard particles, such as tungsten carbide, and binder particles, such as cobalt. The amount and type of powder depends on the type of cutting insert to be manufactured.

Figure 3C:
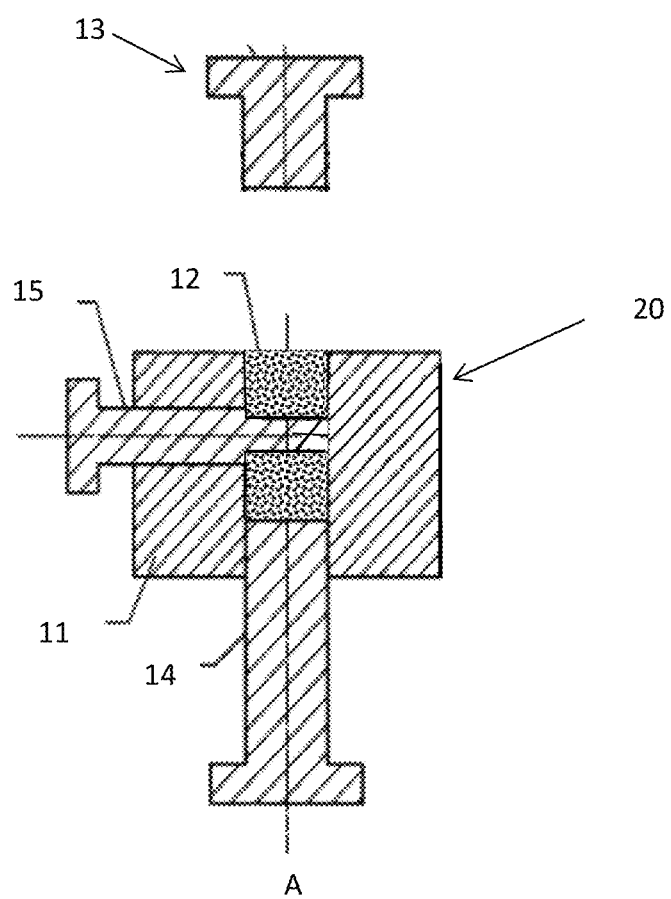

After filling of the die cavity 12, the second, lower, punch 14 may optionally be moved within the die cavity 12 to evenly distribute the powder around the core rod 15, see FIG. 3c. Movement of the second punch 14 may also be performed for this purpose during filling of the die cavity.

In a fourth step, the compaction step, the first and second punches are moved towards each other within the die cavity along the main pressing axis A to compact the powder to a cutting insert green body. The compaction step starts when both opposite punches are in non-compacting contact with the powder in the die cavity and ends when the punches have moved towards each other within the die cavity to a position which is determined by the final dimensions of the cutting insert green body in question.

Figure 3D:
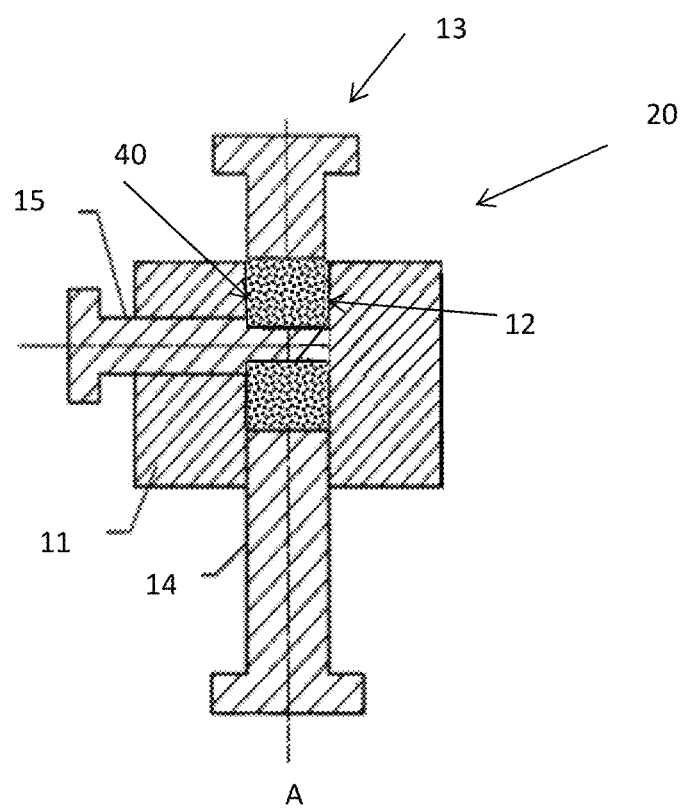

FIG. 3d shows the position of the first and second punches 13, 14 at the start of the compaction step, i.e. the first upper punch 13 and the second lower punch 14 is in non-compacting contact with the powder 40 in the die cavity 12. Prior to the compaction step, the upper first punch 13 may be moved from a position above the die cavity (FIG. 3c) to the position illustrated in FIG. 3d. This movement and the compacting step may be performed as one continuous stroke.

Figure 3E:
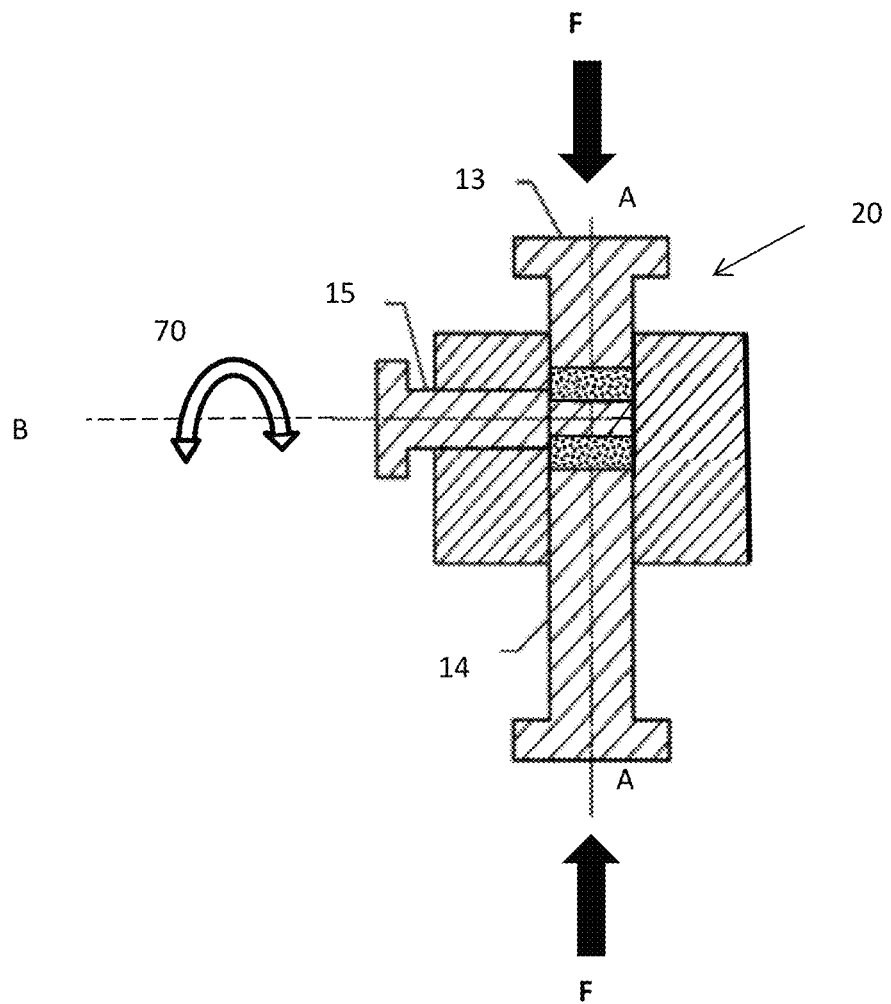

FIG. 3e illustrates the press tool 20 during the compaction step. The first, upper, punch 13 and the second, lower, punch 14 are thereby moved towards each other within the die cavity 12 to compact the powder 40 around the core pin 15. During the compaction step, the force (F) that is applied on the first punch and the second punch may be measured and used to control the compaction of the powder.

The compaction step ends when the opposing punches have moved towards each other within the die cavity to a position which is determined by the final dimensions of the cutting insert green body in question (not shown in the figures).

Figure 3F:
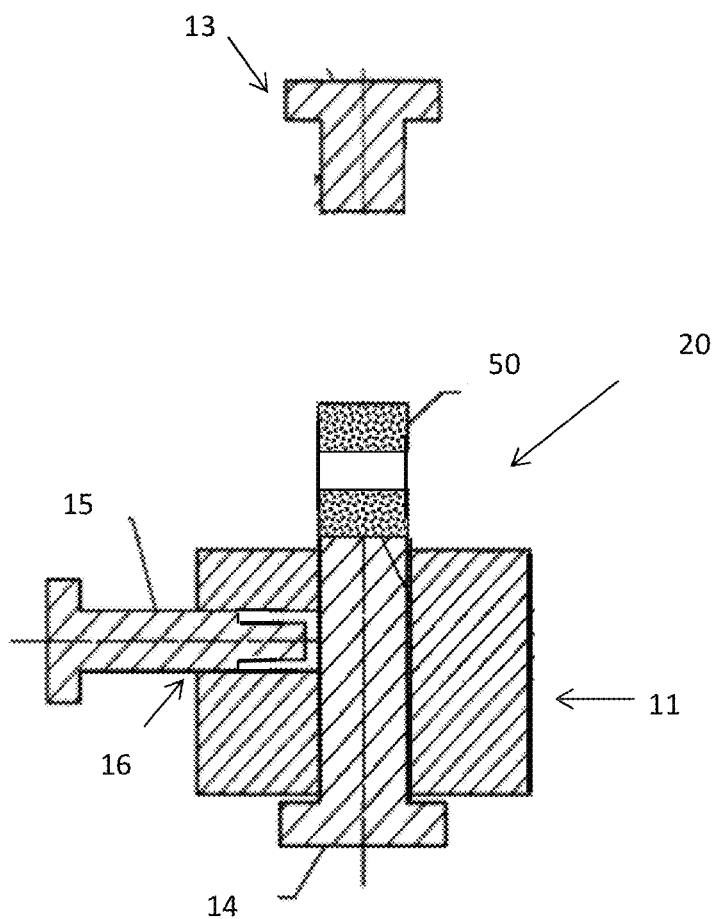

After completion of the compaction step, see FIG. 3f, the core rod 15 and the first and the second punch 13, 14 are moved to an ejection position to allow the cutting insert green body to be removed from the die cavity. Thereby the core rod 15 is retracted from the die cavity through the opening 16 in the wall 17 of the die 11. The second, lower, punch 14 is moved further into the die cavity 12 and pushes thereby the cutting insert green body 50 out of the die cavity 12 and simultaneously the first, upper, punch 13 is moved out of and away from the die cavity 12.

Subsequently, the cutting insert green body is sintered in a sintering step into a cutting insert. Sintering is performed by placing the cutting insert green body in a sintering furnace that is heated to a predetermined temperature above the melting point of binder particles but below the melting point of the hard particles. The predetermined temperature is typically 1250° C.-1950° C. depending on the type of binder material. During that process the volume of the cutting insert is typically reduced by 35-55% due to the fact that the binder particles melt and porosity is reduced. Subsequently, the sintered cutting insert may be subjected to after treatment such as grinding and coating.

According to the disclosure, the core rod 15 is turned, during at least a portion of the compaction step, a predetermined angle in alternating direction around its longitudinal axis. More specifically, the core rod 15 is thereby first turned a predetermined angle in a first direction around its longitudinal axis B (for example clockwise direction). Then the core rod 15 is turned a predetermined angle in the opposite direction around its longitudinal axis B (i.e. anti-clockwise direction). FIG. 3e illustrates schematically, by arrow 70, turning of the core rod 15 in alternating direction around its longitudinal axis B.

It should be appreciated that turning of the core rod 15 may be initiated in either a clockwise or anti-clockwise direction. Core rod 15 may also be turned by the same or different angles each time it is turned. For example, the core rod 15 may first be turned 30° in clockwise direction. Then the core rod 15 may be turned 30° in anti-clockwise direction, thereafter 30° in clockwise direction and then 30° in anti-clockwise direction and so on. Or, according to a second example, the core rod 15 may first be turned 10° in clockwise direction. Then the core rod 15 may be turned 20° in anti-clockwise direction, thereafter 15° in clockwise direction, then 40° in anti-clockwise direction and so on.

It is believed that turning of the core rod during the compaction step results in a very even density distribution in the powder around the through-hole in the cutting insert green body. This will be explained in the following with reference to FIG. 4.

Figure 4:
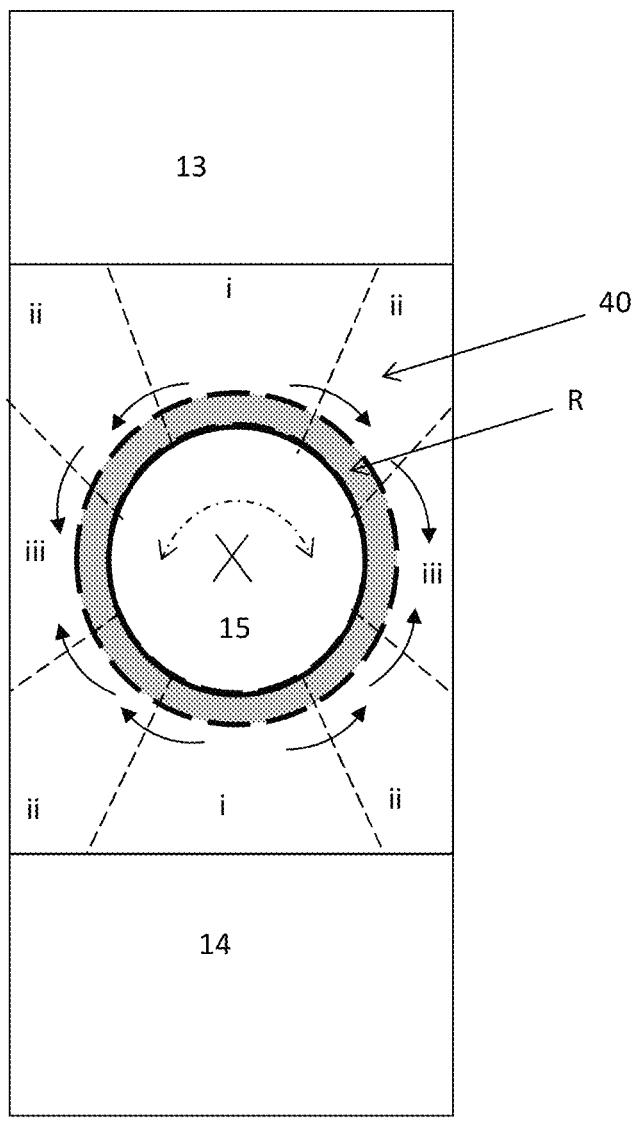
FIG. 4 is a cross-sectional view showing the distribution of powder during manufacturing of a cutting insert according to the inventive method.

FIG. 4 shows schematically an enlarged front view of a portion of the die tool during the compaction step. The powder 40 is distributed around the core rod 15 and compacted between the first and second punches 13, 14. Due to the axial alignment of the first and the second punches 13, 14 and the position of core rod 15 in the die cavity, the powder will be compacted to different densities in different sections of the cutting insert green body. FIG. 4 shows schematically the central section (i), the peripheral section (ii) and the middle section (iii) of the cutting insert green body. The various sections are schematically indicated by dashed lines in FIG. 4, however it should be appreciated that the density distribution in reality is more complex in the cutting insert green body. Highest density is achieved in the central sections (i) since the distance is short between punch and core rod. Lowest density is achieved in the middle sections (iii) due to the relatively long distance between the first and the second punch.

When the core rod 15 is turned alternatingly around it longitudinal axis during compaction of the powder, the friction between the core rod and the surrounding powder causes the powder in a region (R) close to the core rod to shear. Without being bound by any theory, it is understood that the shearing of the powder equalizes the difference in density of the powder in the region around the core rod. The exact mechanism behind this is not entirely known, however it is thought that it, to at least some extent, may be due to redistribution of powder from the central sections of the cutting insert green body to the peripheral- and middle sections thereof (see the arrows in FIG. 4).

The overall effect is a very even density distribution around the through-hole in the cutting insert green body, which in turn results in a minimum of deformation of the through-hole as the cutting insert green body shrinks during sintering.

A further positive effect is that the equalizing of the density in the cutting insert green body causes an overall reduction of the porosity in the cutting insert green body. This effect is especially high in the middle section (iii) of the cutting insert green body.

To equalize the density around the through-hole of the cutting insert green body it is necessary to turn the core rod by an angle larger than 0°. The density of the powder in the middle- and the peripheral sections of the cutting insert green body increases with increasing turning angle and therefore large angles are preferred. However, the predetermined angle should not exceed 180° since that would cause an unsymmetrical density distribution.

The predetermined angle should be 90° or less. It is understood that an even density distribution thereby is achieved around the through-hole by redistribution of powder from the dense central section (i) of the cutting insert green body to the less dense middle section (iii).

It is further understood that large turning angles promote crack formation and therefore the turning angle should be small. Preferably, the predetermined angle is 5-40°, more preferred 10-30°, more preferred 5-20°, more preferred 10-20°. Optimized shear and a good redistribution of powder thereby is achieved around the core rod. This minimizes the risk of formation of cracks in the cutting insert green body.

Turning of the core rod may be initiated at the very start of the compaction step or during or prior to lowering of the first punch from a position above the die cavity. Turning of the core rod may also be initiated after start of the compaction step. However, during the compaction step the overall density in the cutting insert green body increases and when the density is high turning of the core rod could cause cracks in the cutting insert green body. On the other hand, turning of the core rod at the end of the compaction step can result in more efficient equalizing of the density around the through-hole. This is thought to be caused by higher shear rate and/or increased powder redistribution due to high friction between core rod and powder at the end of the compaction step.

Taking the above into consideration, it is preferred to turn the core rod with large angles, such as 30-180°, at the beginning of the compaction step, such as the first 75% or 50% or 35% thereof and with smaller angles, such as 5-40° towards the end of the compaction step, such as the last 10% or 15% or 25% or 35% thereof.

Due to the risk of crack formation the core rod should however only be turned during a first portion of the compaction step and remain immovable during the final portion. For example, the core rod is turned during the initial 90-95% of the compaction step, (i.e. 0-95% or 0-90% thereof) and remains immovable during the last 5-10% of the compaction step. Preferably turning is performed during the first 75% of the compaction step, more preferred during the first 50% of the compaction step and remains immovable during the last 25% of the compaction step, more preferred the last 50% thereof.

For example, the core rod may be turned with angles of ≤90° at the first 50% of the compaction step and with angles of ≤45° from 50% to 85% of the compaction step and with angles of ≤5-10° from 85%-95% of the compaction step. During the last 5-15% of the compaction step, the core rod is immovable.

It is of course possible to turn the core rod only during the end period of the compaction step, e.g. during 50%-95% thereof. This is believed to result in an effective redistribution of the powder in the cutting insert green body.

It is also possible to initiate turning of the core rod with a large angle, such as 180° at the beginning of the compaction step and gradually reduce the turning angle to 0° at the end of the compaction step.

The amount of times the core rod is turned during a compaction step is important since it is believed that redistribution of powder around the core rod increases with increased turning frequency. However, too frequent turning may cause cracks in the cutting insert green body. Preferably, the core rod is therefore turned 20-100 times during a compaction step, more preferred 30-70, even more preferred 40-60 times.

A compaction step is short and typically lasts for only 0.3-1 second. In order to enable turning of the core rod a sufficient amount of times, it may therefore be necessary to control the velocity of the opposing punches during the compaction step. This may for example be achieved, by reducing the velocity of the punches or by halting the movement of the punches one or more times during the compaction step. To avoid too long compaction steps with resulting low productivity, the frequency of the turning should be kept low, e.g. 30-70 turns.

By one turn is meant that the core rod is turned a predetermined angle in either clockwise or anti-clockwise direction.

It is appreciated that the risk of cracks and the density distribution in the cutting insert depends on the type of powder used and the design of the insert. Therefore, the conditions above have to be determined in each individual case.

Figure 5:
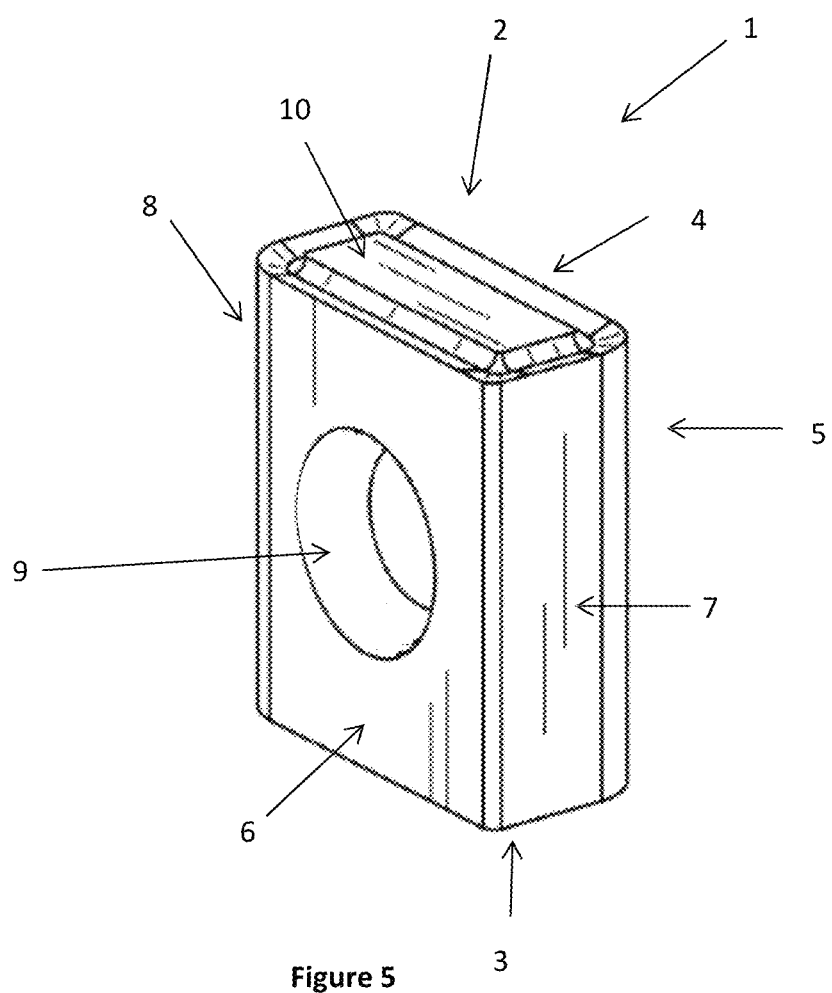
FIG. 5 is a perspective view showing a cutting insert manufactured by the method of the present disclosure.

FIG. 5 shows schematically one example of a tangential cutting insert 1 manufactured by the present method. The cutting insert is a cross-hole cutting insert, i.e. it has a through-going cross-hole 9. The cutting insert has upper and lower rake surfaces 2 and 3 each having a circumferential cutting edge 4. In the center of each rake surface, a chip face 10 is formed for chip breaking. In FIG. 5 only the upper rake surface 2 is visible, however the upper and lower rake surfaces are identical.

During manufacturing, the rake surfaces 2 and 3 are formed by the upper and lower punches. The cutting insert 1 further includes opposite front surfaces 5 and 6 and opposite side surfaces 7 and 8 which extends between the upper and lower rake surfaces 2 and 3. During manufacturing, the front and side surfaces are formed by the walls of the die cavity 12. The cross-hole 9 for clamping the cutting insert to a tool holder (not shown) extends axially between the rake surfaces 2 and 3 and through the opposite front surfaces 5 and 6. Hence, the cross-hole 9 extends non-parallel, such as perpendicular, to the pressing direction during manufacturing of the insert.

Although particular embodiments have been disclosed in detail this have been done for the purpose of illustration only and is not intended to be limiting. In particular it is contemplated the various substitutions, alterations and modifications may be made within the scope of the appended claims.

For example, during the compaction step the force, F, that is applied by the opposing punches may be measured and used for controlling the angle and frequency of the turning of the core rod 15 (see FIG. 3*e*). The applied force F corresponds to the overall density of the cutting insert green body, and therefore also to the friction between core rod and powder and is therefore suitable to use for optimizing the angle and frequency of the turning of the core rod to avoid the formation of cracks.

It is also possible to measure the torque that is applied on the core rod and use this value for controlling the turning angle and turning frequency of the core rod.

The invention claimed is:

1. A method for manufacturing a cutting insert having a through-hole, by using a press tool including a die having a die cavity extending through the die along a first pressing axis, a first punch and a second punch, which are movable toward and away from each other and along said first pressing axis, and a core rod, that is arranged to be inserted into the die cavity in a direction which is non-parallel to the first pressing axis, the method comprising the steps:

moving the first and second punches to a die filling position;

inserting the core rod into the die cavity;

filling the die cavity with powder;

moving the first and second punches within the die cavity toward each other along the first pressing axis to compact the powder around the core rod into a cutting insert green body;

moving the core rod and the first and second punches to an ejection position to allow removal of the cutting insert green body from the die; and sintering the cutting insert green body, wherein during at least a portion of the compaction step, the core rod is turned a predetermined angle in alternating directions around its longitudinal axis.

2. The method according to claim 1, wherein the core rod is turned in the same predetermined angle around its longitudinal axis.

3. The method according to claim 1, wherein the core rod is turned in different predetermined angles around its longitudinal axis.

4. The method according to claim 1, wherein the predetermined angle is <180°.

5. The method according to claim 4, wherein the predetermined angle is 5°-40°.

6. The method according to claim 1, wherein the core rod is turned during 50-95% of the compaction step.

7. The method according to claim 1, wherein the core rod is inserted into the die cavity in a direction perpendicular to the first pressing axis.

8. The method according to claim 1, wherein the core rod is turned a predetermined number of times during said compaction step.

9. The method according to claim 8, wherein the velocity of the punches is controlled during the compaction step depending upon the predetermined number of turns of the core rod.

10. The method according to claim 1, wherein the force applied on the opposing punches is measured during the compaction step and used to control the turning angle and/or the number of turns of the core rod.

11. The method according to claim 1, wherein the predetermined angle is <90°.

12. The method according to claim 11, wherein the predetermined angle is 5°-40°.

13. The method according to claim 11, wherein the predetermined angle is 10-30°.

14. The method according to claim 11, wherein the predetermined angle is 5-20°.

15. The method according to claim 11, wherein the predetermined angle is 10-20°.

* * * * *